June 26, 1928.
L. E. SLAUSON
REVERSIBLE LUG WHEEL
Original Filed Feb. 16, 1921
1,674,803
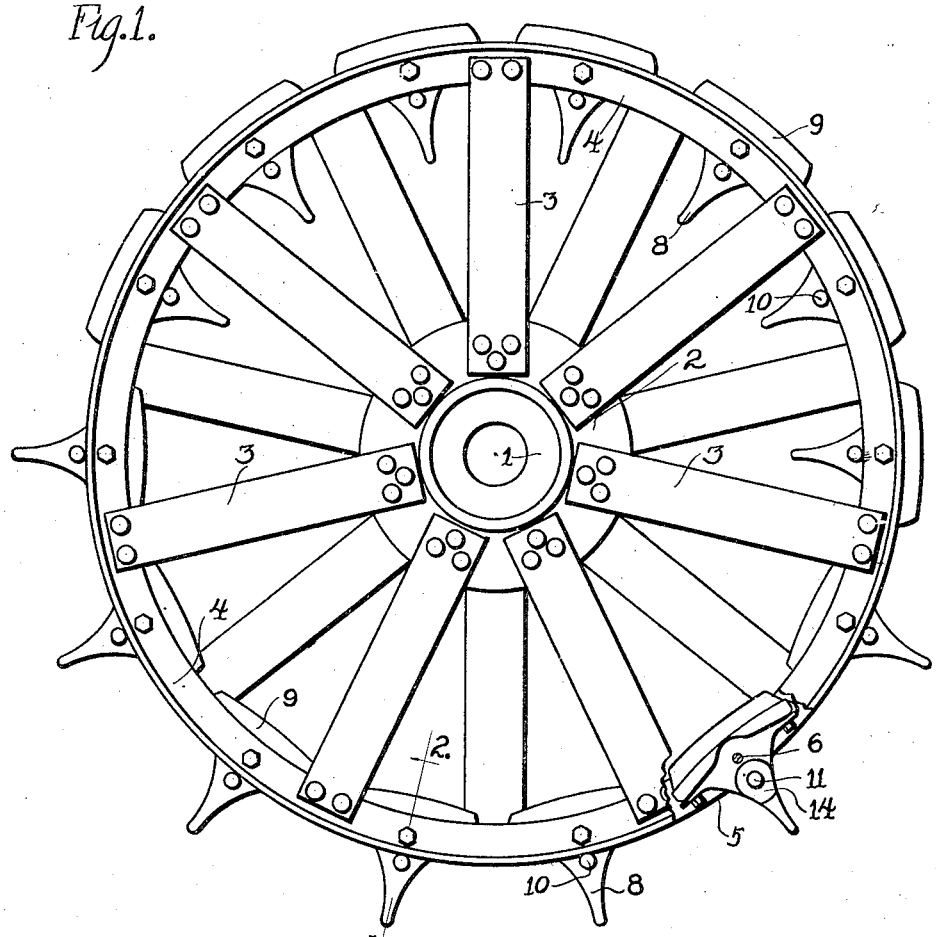
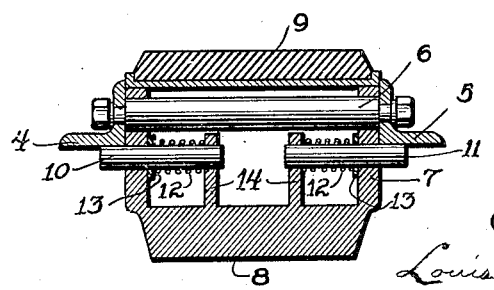
Inventor
Louis E. Slauson
By Wm. O. Belt.
Attorney.

Patented June 26, 1928.

1,674,803

UNITED STATES PATENT OFFICE.

LOUIS E. SLAUSON, OF MOLINE, ILLINOIS, ASSIGNOR TO GRID-IRON-GRIP COMPANY, OF ROCK ISLAND, ILLINOIS, A COMMON-LAW TRUST.

REVERSIBLE LUG WHEEL.

Application filed February 16, 1921, Serial No. 445,325. Renewed October 2, 1924.

My invention relates to traction wheels such as are used on tractors, threshing machines, road rollers, and other similar vehicles and consists in an improved tread construction.

One object of my invention is to construct an economical but sturdy wheel having a tread adapted to provide the wheel with outwardly extending projections to engage soft soil and prevent slipping of the wheel or to provide a smooth, substantially continuous tread surface.

An additional object is to provide a wheel with a changeable tread which, in one form, provides a tire of rubber or other resilient material.

I accomplish the above objects by means of a reversible tread section and an additional object of my invention is to mount such a section upon the wheel so that it may be reversed quickly and easily and secured in either position without the use of any special tools and preferably without using any tools whatsoever.

In the accompanying drawings illustrating my invention

Figure 1 is an elevation of my wheel with the tread sections about half of its rim providing outwardly projecting teeth and with the tread sections about its other half providing a smooth tread surface.

Figure 2 is a vertical transverse section on line 2—2 of Figure 1.

The wheel has a hub 1 of any approved construction and having a flange 2 to which spokes 3 are secured. The rim of the wheel consists of two angle irons, 4 and 5, each bent into a circle and mounted on hub 1 by the spokes. The rim angle irons are placed parallel to each other but spaced apart with one flange of each in the general plane of the wheel and the other flange of each extending outwardly therefrom.

The angle irons 4 and 5 are secured in spaced relation by shouldered studs 6 or equivalent bolts and bushings. Each stud 6 also forms a bearing for a reversible tread section 7 having a spade like projection 8 and a broad, flat tread surface diametrically opposite the projection 8. It will be noted that the axis of the tread section is located eccentrically of its oppositely directed faces so that as it is swung upon stud 6 the projection 8 will extend considerably further beyond rim angle irons 4 and 5 than will the flat tread portion.

While the tread portion opposite projection 8 may consist of a broad, smooth, integral part of the tread section, I prefer to adapt that portion of the tread section to mount a block 9 of rubber, wood, or other tire material, which may be removed when worn.

Spaced from the axis of the tread section and parallel therewith, is a transverse passage and sliding pins 10 and 11 are mounted therein and each is equipped with a coil spring 12 and a collar 13 against which the pin spring bears and thrusts the pin outwardly. I have shown the tread section with ribs 14 which form additional bearings for the pins and seats for springs 12.

The axis of stud 6 passes through the centers of the vertical flange of the rim angles and the axis of the pin passage is spaced from the stud axis far enough for the pins to bear against the horizontal flanges of the rim angle irons when in the position shown in Figure 2 or to bear against the edges of the vertical flanges when reversed.

When it is desired to reverse the tread sections, pins 10 and 11 are pressed towards each other until their ends pass beyond the edge of the rim angles and the tread section may be turned on its stud to the reverse position. As soon as this position is reached springs 12 and 13 thrust their respective pins outwardly and they engage the rim angles to hold the tread section in the reversed position. This reversal is accomplished without the use of any tools. There are no nuts or screws to be loosened and the reversal of all the tread sections on each wheel of the vehicle may be accomplished in a few minutes.

The embodiment of the invention illustrated in the drawings is one which I conceive to be highly efficient for the purpose intended but I reserve the right to make all such changes in the form, construction and proportion of parts as fairly fall within the scope of the following claims.

I claim:

1. In a traction wheel, parallel, spaced, rim elements, a tread section positioned between said elements, a pivot mounting said tread section on said elements, a recess in said tread section spaced from said pivot, a plunger seated in said recess and normally extending outwardly therefrom to engage said rim to prevent pivotal movement of the tread section but adapted to be retracted therein to permit pivotal movement of the tread section.

2. In a traction wheel, a rim, a tread section having a projection on one side and a resilient face on its opposite side and pivotally mounted on said rim so as to present either said projection or said face outwardly of the wheel, and an element yieldingly projected from the side of said tread section and adapted to engage an edge of said rim in either position of the tread section.

3. In a traction wheel, a rim, a reversible tread section eccentrically pivoted on said rim and having a projection and a relatively smooth tread surface, and yielding means adapted to engage the top or bottom of said rim for securing said tread section with either said projection or said surface in operative position.

4. In a traction wheel, a rim, a tread section having a projection at one side and a relatively smooth tread surface at the opposite side, a pivoted connection between said tread section and said rim, the axis of said connection being nearer to said tread surface than to said projection, and yielding means adapted to engage the top or bottom of said rim for securing said tread section against pivotal movement, with either said projection or said surface in operative position.

5. In a traction wheel, a rim, a tread section having a single, long, spade like projection and opposite thereto a relatively smooth tread surface, means for eccentrically pivoting said tread section in said rim to permit either the tread surface or the projection to be located outwardly from the rim, and yielding means adapted to engage the top or bottom of said rim for securing said tread section in adjusted position.

6. In a traction wheel, a rim, a tread section having a projection on one side and a tread surface on its opposite side and pivotally mounted on said rim so as to present either said projection or said face outwardly of the wheel and an element yieldingly projected from the side of said tread section and adapted to engage an edge of said rim to hold said tread section in either of said positions.

7. In a traction wheel, a rim, a tread section having a projection on one side and a projecting tread surface on the opposite side and pivotally mounted on said rim so as to present either said projection or said surface outwardly of the wheel, and a yielding element on said tread section and adapted to engage said rim to hold said tread section in either of said positions.

8. A wheel comprising spaced rim plates, a plurality of tread sections interposed therebetween, means for pivotally supporting each of said sections by the plates, each of said sections having oppositely arranged surfaces adapted to be positioned to serve as the tread of the wheel, and laterally movable locking means carried by each of the sections engageable with the rim for holding the section in either of its two positions.

LOUIS E. SLAUSON.